Patented Sept. 27, 1949

2,482,760

UNITED STATES PATENT OFFICE 2,482,760

PURIFICATION OF OLEIC ACID

Charles G. Goebel, Cincinnati, Ohio, assignor to Emery Industries, Inc., Cincinnati, Ohio, a corporation of Ohio No Drawing. Application June 20, 1946, Serial No. 678,160

7 Claims. (Cl. 260—419)

This invention relates to the purification of oleic acid and more particularly to the elimination of polyunsaturated materials which are normally present in oleic acid as produced commercially.

Commercial oleic acid is often spoken of as "red oil" and, in addition to oleic acid, contains as much as 8 to 15 per cent polyunsaturated fatty material and has a reddish or yellowish color. For many purposes the commercial product is satisfactory; however, many other instances occur in which a purer compound having only small percentages of polyunsaturated material is desirable, as in analytical work, or in rubber compounding, when no more than 6 per cent of polyunsaturated material is permissible. Also, oleic acid is used as a raw material in the production of azelaic acid and pelargonic acid by destructive oxidation to cleave the double bond, as described in the copending application, S. N. 518,992, now Patent No. 2,450,858, of Fitzpatrick and Myers. In this oxidation reaction the presence of polyunsaturated material is undesirable because such material utilizes a large amount of oxidizing agent and produces undesirable short chain fatty acids, carbon dioxide, and water because when polyunsaturated material is oxidized, that part of the material which is between two or more unsaturated linkages normally is oxidized completely into carbon dioxide and water, which are valueless. Therefore, for oxidation an oleic acid is required which contains a minimum of polyunsaturated impurities.

Oleic acid cannot be freed from polyunsaturated acids by simple distillation because the polyunsaturated acids distill at substantially the same temperatures as the oleic acid and distill over with the oleic acid. The principal objective of this invention has been to produce a commercially satisfactory method for removing polyunsaturated material from oleic acid without destroying the oleic acid, and, at the same time, to produce valuable products from the polyunsaturated acids.

It has been known that the more highly saturated acids can be caused to polymerize by heating to high temperatures and that the polymers thus formed are high boiling and therefore can be removed as residues in ordinary distilling practice. The temperatures and length of time of heating required to obtain polymerization have however caused serious decomposition of the fatty acids as evidenced by a considerable decrease in the free acid content.

I have found that this decomposition can be avoided by maintaining a small amount of water in the acids during the polymerization step. Only the amount of water need be present which dissolves in the fatty acid under relatively moderate pressures, i. e., pressures far below the pressure of saturated steam at the temperatures employed. Actually too great a quantity of water, for example, the amount employed in high pressure splitting of fatty acids, is a serious disadvantage as such quantities of water act as diluents and inhibit the polymerization of the more highly unsaturated acids.

The time and temperature required for polymerization are interdependent; thus, lower temperatures require a longer time and vice versa. The amount of moisture present which should be just sufficient to prevent decarboxylation is controlled entirely by the pressure maintained on the system.

In my co-pending application Serial No. 681,765, I have disclosed a method of polymerizing polyunsaturated fatty acids by heating to a polymerizing temperature in the presence of a small amount of water. I have discovered that, at the temperatures at which polyunsaturated fatty acids polymerize, oleic acid is substantially unaffected and that polyunsaturated material in commercial oleic acid can be polymerized by heating in the presence of a small amount of moisture at a temperature of up to approximately 360° C. to give polymerized acids without causing chemical change to a substantial amount of the oleic acid. The oleic acid may then be separated from the polymerized fatty material by vacuum distillation or other conventional separation steps. Moreover, the polymerized residual acids formed as a by-product are valuable di or polycarboxylic acids which may be used in the preparation of synthetic resins and for other purposes. In the heating the polyunsaturated materials are believed to polymerize to form cross linkages at the points of polyunsaturation and form polymeric di or tri carboxylic acids of high molecular weight which do not distill off with oleic acid.

Briefly, the present invention provides a method of purifying commercial oleic acid which includes the steps of heating the oleic acid in the presence of a small amount of water at a temperature of from approximately 260 to 360° C., followed by distillation or other separation steps to remove a purified oleic acid from the residual polymer acids formed. Small amounts of various polymerization catalysts for example, lead acetate, may, if desirable, be used during heating to speed up polymerization.

Higher temperatures can be used, the upper temperature being limited only by pressure and the decomposition point of the fatty acids. For example oleic acid decomposes quite rapidly at 400° C. under 300 pounds per square inch pressure but not so rapidly at higher pressures. It is believed that the principle involved is the keeping of enough steam pressure in the reaction autoclave to exceed the decomposition pressure of the fatty acids at the reaction temperature.

A small amount of moisture is maintained in the acids during polymerization by maintaining an atmosphere of steam or other moisture laden gas over the acid while it is heated. No liquid water need be present in the reaction vessel and superheated steam can be employed. A steam pressure as low as 80 pounds per square inch is suitable but for best results I prefer to use a pressure of approximately 300 pounds per square inch. Higher pressures up to the pressure of saturated steam at the polymerizing temperature also may be employed but high pressures are not necessary to the reaction.

The purified oleic acid conveniently is removed from the polymerized acids by distillation or solvent separation, or other suitable separation method.

The preferred method of introducing steam is to attach a line carrying steam of the desired pressure to the reaction vessel during heating. An alternate method is to add water to the acid before heating is commenced and then heat in a pressure vessel while venting the vessel to withdraw excess moisture and lower the pressure to the desired amount.

The following example is given to illustrate the invention. Variations will be apparent to one skilled in the art, and the invention is not intended to be limited by the example except as pointed out in the appended claims.

*Example*

2000 parts by weight of commercial oleic acid and 2 parts of lead acetate were heated in a pressure vessel under a pressure of 325 pounds per square inch of steam. The pressure vessel contents were heated at a temperature of between 325° and 330° C. for 2½ hours. The material was bleached with 3 parts of bleaching earth. The bleach was removed and the material was distilled. 88 per cent of the material distilled leaving a residue of 12 per cent. The distillate had an iodine value of 85 and the residue 81.4 as opposed to an iodine value of 86 for the total treated material. The neutral equivalent of the distillate was 281 and of the residue 405. The color of the distillate was 1.2/0 Lovibond scale. Spectrophotometric analysis of the original commercial oleic acid showed 11.87 per cent polyunsaturated material. On the other hand the distillate had only 4.77 per cent polyunsaturated material.

In this manner, commercial oleic acid may be heated in the presence of moisture to polymerize polyunsaturated acids in the commercial oleic acid and form dimeric or polymeric acids. The oleic acid can then be distilled or otherwise separated from the residual acids. A purified oleic acid is thus prepared and, in addition, valuable dimeric or polymeric by-product acids are formed.

An alternate method of purifying oleic acid in accordance with this invention is to fill a pressure vessel with commercial oleic acid and a small amount of water and heat while venting sufficiently to allow some oleic acid to escape due to expansion, setting the relief valve at an appropriate value of say 80 to 100 pounds per square inch. In this manner the commercial oleic acid is heated in the presence of a small amount of water and without any atmosphere over the acid during heating. It is believed that it is the water in the acid which prevents decomposition of the oleic acid and polyunsaturated acids therein; and, although the normal method of insuring the presence of water is to provide steam pressure or an atmosphere of high humidity over the acid while it is heated, this alternate method by which reactants are held wholly liquid may be employed.

Having described my invention, I claim:

1. A method of purifying oleic acid which contains polyunsaturated fatty acids, said method comprising heating the oleic acid to a polymerizing temperature which is below the decomposition temperature thereof, in the presence of a small proportion of dissolved water, maintaining dissolved water in dissolved state in the acid during heating by means of pressure, and continuing the heating for a period of time which is sufficient to polymerize polyunsaturated fatty acids, and subsequently treating the heated product at a reduced pressure to distill a purified oleic acid from polymerized polyunsaturated acids.

2. A method of separating oleic acid from a polyunsaturated fatty acid which comprises heating a mixture containing oleic acid and polyunsaturated fatty acids to a temperature in excess of at least about 260° C. in the presence of a small proportion of dissolved water, maintaining the dissolved water in liquid state by pressure, the temperature to which the mixture is heated being below the decomposition temperature of oleic acid at the pressure used, and the heating being continued for a sufficient period of time to polymerize said polyunsaturated material present in the mixture, then separating oleic acid from polymerized polyunsaturated material.

3. In the purifying of crude oleic acid, the steps of heating the crude oleic acid at a temperature in excess of at least about 260° C. but below the decomposition temperature of oleic acid for a period of time sufficient to polymerize polyunsaturated fatty acids in the crude oleic acid, while maintaining a small proportion of dissolved water in the crude oleic acid under a steam pressure of between 80 pounds per square inch and the pressure of saturated steam at the temperature to which the crude oleic acid is heated during said polymerization.

4. A method of purifying crude oleic acid which contains polyunsaturated fatty acids, said method comprising heating the crude oleic acid to a polymerizing temperature which is in excess of about 260° C. but which is below the decomposition temperature of oleic acid, in the presence of the proportion of water which will dissolve in the crude oleic acid under a pressure of between 80 pounds per square inch and the pressure of saturated steam at the temperature to which the crude oleic acid is heated, and maintaining the said temperature and pressure for a sufficient period of time to polymerize polyunsaturated acids, and then separating oleic acid from the polymerized polyunsaturated acids.

5. A method of purifying crude oleic acid which contains polyunsaturated fatty acids, said method comprising heating the acid to a temperature of between 260° and 360° C. in the presence of steam and a small proportion of dissolved water at a pressure of between 80 pounds per square inch and the pressure of saturated steam at said temperature for a sufficient time to polymerize the polyunsaturated acids, and then separating oleic acid from the polymerized polyunsaturated acids.

6. A method of purifying crude oleic acid which contains polyunsaturated fatty acids, said method comprising heating the acid to a temperature of between 260° C. and 360° C. in the presence of steam and a small proportion of dissolved water at a pressure of between 80 pounds per square inch and the pressure of saturated steam at said temperature for a sufficient time to polymerize the polyunsaturated acids, and then distilling under reduced pressure to separate oleic acid from the polymerized polyunsaturated acids.

7. A method of purifying crude oleic acid which contains polyunsaturated fatty acids, said method comprising heating the acid to a temperature of between about 260° C. and 360° C. in the presence of steam and a small proportion of dissolved water at a pressure of substantially 300 pounds per square inch for a sufficient time to polymerize the polyunsaturated acids, and then separating oleic acid from polymerized polyunsaturated acids.

CHARLES G. GOEBEL.

REFERENCES CITED

The following references are of record in the file of this patent:

UNITED STATES PATENTS

| Number | Name | Date |
|---|---|---|
| 1,122,400 | Kaempfe | Dec. 29, 1914 |
| 2,155,009 | Fawcett et al. | Apr. 18, 1939 |